(12) United States Patent
Liu (10) Patent No.: US 10,690,175 B1
(45) Date of Patent: Jun. 23, 2020

(54) PRESSURE BALANCING DEVICE AND SUCKER USING THE SAME

(71) Applicant: Dongguan Yojet Industrial Co., Ltd., Dongguan (CN)

(72) Inventor: Renyou Liu, Dongguan (CN)

(73) Assignee: Dongguan Yojet Industrial Co., Ltd., Dongguan (CN)

( * ) Notice: Subject to any disclaimer, the term of this patent is extended or adjusted under 35 U.S.C. 154(b) by 0 days.

(21) Appl. No.: 16/289,180

(22) Filed: Feb. 28, 2019

(30) Foreign Application Priority Data

Nov. 29, 2018 (CN) .......................... 2018 1 1443734
Nov. 29, 2018 (CN) .......................... 2018 2 1993330
Dec. 29, 2018 (CN) .......................... 2018 2 2277639

(51) Int. Cl.
*F16B 47/00* (2006.01)
*B25B 11/00* (2006.01)
*B65G 49/06* (2006.01)
*F16M 13/02* (2006.01)

(52) U.S. Cl.
CPC .......... *F16B 47/006* (2013.01); *B25B 11/007* (2013.01); *B65G 49/061* (2013.01); *B65G 2249/045* (2013.01); *F16M 13/022* (2013.01)

(58) Field of Classification Search
CPC ...... F16B 47/00; F16B 47/006; F16M 13/022

USPC ....... 248/205.8, 205.5, 309.3, 362, 363, 683
See application file for complete search history.

(56) References Cited

U.S. PATENT DOCUMENTS

| | | | | |
|---|---|---|---|---|
| 8,356,781 B2 * | 1/2013 | Chen | ...................... | F16B 47/006 248/206.2 |
| 2008/0251664 A1 * | 10/2008 | Hara | ...................... | F16B 47/00 248/205.8 |
| 2014/0346295 A1 * | 11/2014 | Song | ...................... | F16B 47/00 248/205.8 |
| 2015/0076299 A1 * | 3/2015 | Yu | ...................... | F16M 13/022 248/205.8 |

* cited by examiner

*Primary Examiner* — Todd M Epps
(74) *Attorney, Agent, or Firm* — Wang Law Firm, Inc.

(57) ABSTRACT

The pressure balancing device comprises a housing, a deformation medium accommodated in the housing and capable of deforming under compression, and a sealing member movably connected with the housing and capable of deforming under pressure. When part of the deformation medium is compressed by the sealing member, the deformation medium deforms so that a part, not compressed, of the deformation medium compresses a corresponding part of the sealing member to make it protrude outwards. The pressure balancing device is simple in structure, easy to assemble and convenient to operate, and raw material cost and processing cost are saved a lot.

11 Claims, 12 Drawing Sheets

PRESSURE BALANCING DEVICE AND SUCKER USING THE SAME

BACKGROUND OF THE INVENTION

1. Technical Field

The invention relates to the technical field of suckers, in particular to a pressure balancing device and a sucker using the same.

2. Description of Related Art

Sucker products available in the market now include suckers capable of adhering to smooth surfaces such as glass, and suckers capable of adhering to rough surfaces have also appeared in recent years. However, most of the existing suckers can adhere to a surface only when the surface is a plane, but cannot adhere to a curved surface. Even if a sucker can adhere to a curved surface, a device for bending the sucker has a complex structure and a large number of parts, which is not conducive to saving raw material cost and processing cost.

BRIEF SUMMARY OF THE INVENTION

In order to overcome the defects and deficiencies in the prior art, the invention aims to provide a pressure balancing device which is simple in structure, easy to assemble and convenient to operate, and can greatly save raw material cost and processing cost. According to the pressure balancing device, a bottom end of a sealing member can be in full contact with a curved surface, so that the pressure balancing device is stressed uniformly, and the effect of pressure balancing is achieved. The pressure balancing device is applied to a sucker, and the sucker can adhere not only to a plane, but also to a curved surface, which is a breakthrough of the traditional technology of suckers.

Another object of the invention is to provide a sucker using the pressure balancing device. In use, a bottom end of a sealing member abuts against a sucker body, so that a sucking surface of the sucker body can make full contact with a curved surface, and then the sucker can adhere to the curved surface; at this point, air between a sucked surface and the sucking surface of the sucker body is discharged, and an airtight state is realized between the sucked surface and the sucking surface of the sucker body; and then, a connecting rod is pulled to make the airtight space formed by the sucked surface and the sucker body larger and the suction effect stronger. The sucker of the invention can adhere not only to a plane, but also to a curved surface, and overcomes the defect that a traditional sucker cannot adhere to a curved surface.

The object of the invention is realized through the following technical scheme: a pressure balancing device comprises a housing, a deformation medium accommodated in the housing and capable of deforming under compression, and a sealing member movably connected with the housing and capable of deforming under pressure, wherein an airtight cavity is formed between the housing and the sealing member, the deformation medium is accommodated in the cavity, and a bottom end of the sealing member protrudes out of the housing and is used for abutting against an external structure; and when part of the deformation medium is compressed by the sealing member, the deformation medium deforms so that a part, not compressed, of the deformation medium compresses a corresponding part of the sealing member to make it protrude outwards.

Preferably, the housing is provided with a storage slot for accommodating the deformation medium, a bottom wall of the storage slot is provided with accommodation through holes, the sealing member protrudes out of a bottom of the accommodation through hole and abuts against a side wall of the accommodation through hole, and the airtight cavity is formed between an inner wall of the storage slot, the sealing member and the housing.

Preferably, the sealing member comprises a plurality of sealing posts protruding out of the bottom of the accommodation through hole and abutting against the side wall of the accommodation through hole, and the sealing posts are movably connected with the housing.

Preferably, the sealing member further comprises first sealing rings sleeved on each sealing post, each first sealing ring abuts against the side wall of the corresponding accommodation through hole, a side wall of each sealing post is provided with a first groove, and each first sealing ring is accommodated in the corresponding first groove.

Preferably, the sealing member is a sealing gasket, the sealing gasket abuts against an inner wall of the housing and protrudes out of a bottom of the housing, and the airtight cavity is formed between the sealing gasket and the housing.

Preferably, the bottom of the housing is provided with an anti-disengaging member for preventing the sealing member from disengaging from the housing, and the anti-disengaging member is provided with receding holes for the sealing gasket to penetrate through the anti-disengaging member.

Preferably, the anti-disengaging member comprises a first limiting piece and a second limiting piece which are both arranged on an inner wall of the housing, the receding holes are formed between the first limiting piece and the second limiting piece, and the first limiting piece and the second limiting piece both abut against the sealing gasket.

Preferably, the anti-disengaging member comprises a fixing member abutting against the bottom of the housing, the receding holes are formed in the fixing member, the sealing gasket penetrates through the fixing member through the receding holes, and the number of the receding holes is at least two.

Preferably, the sealing gasket is provided with receding grooves, and the fixing member is in contact with the sealing gasket through the receding grooves.

Preferably, the housing is of an integrated structure, a top of the housing is provided with injection holes for injecting the deformation medium into the cavity, and a top of each injection hole is provided with a sealing mechanism for sealing the injection hole.

Another object of the invention is realized through the following technical scheme: a sucker using the above pressure balancing device comprises the pressure balancing device, a connecting rod penetrating through the pressure balancing device, and a sucker body connected with the connecting rod, and a bottom end of the sealing member abuts against the sucker body.

The invention has the beneficial effects that when the pressure balancing device is in a normal state, the bottom end of the sealing member is located on the same horizontal plane; in actual use, the bottom end of the sealing member abuts against a contact surface of the external structure; when the contact surface of the external structure is flat, by manually applying downward pressure to the pressure balancing device, the bottom end of the sealing member is in full contact with the contact surface of the external structure, and the sealing member is stressed uniformly, as a result, the pressure balancing device is stressed uniformly and the effect of pressure balancing is achieved; when the contact surface of the external structure is a curved surface, the bottom end of the sealing member is not in full contact with the curved surface, that is, a part of the sealing member is in contact with the curved surface and the other part of the sealing member is not in contact with the curved surface, at this point, by applying downward pressure to the pressure balancing device, a part, in contact with the curved surface, of the sealing member is compressed to bend along a radian of the curved surface and compress a corresponding part of the deformation medium, that is, the sealing member deforms, the corresponding part of the deformation medium is compressed, that is, the deformation medium deforms, a part, not compressed, of the deformation medium compresses a part, not compressed by the contact surface, of the sealing member to make it protrude outwards in a direction close to the contact surface (that is, when the sealing member and the deformation medium are partially compressed inwards, the rest of the sealing member and the rest of the deformation medium protrude outwards, and the working principle is the same as that of an air cushion being compressed), finally, a bottom surface of the sealing member is in full contact with the contact surface, and the bottom surface of the sealing member of the pressure balancing device and the contact surface are equally stressed at this point, thus achieving the effect of pressure balancing. The pressure balancing device is simple in structure, easy to assemble and convenient to operate, raw material cost and processing cost are saved a lot, the bottom end of the sealing member can be in full contact with the curved surface, so that the pressure balancing device is stressed uniformly, and the effect of pressure balancing is achieved. The pressure balancing device is applied to a sucker, and the sucker can adhere not only to a plane, but also to a curved surface, which is a breakthrough of the traditional technology of suckers.

When the sucker using the pressure balancing device of the invention is used, the bottom end of the sealing member abuts against the sucker body, so that the sucking surface of the sucker body can make full contact with the curved surface, and then the sucker can adhere to the curved surface; at this point, air between the sucked surface and the sucking surface of the sucker body is discharged, and an airtight state is realized between the sucked surface and the sucking surface of the sucker body; and then, the connecting rod is pulled to make the airtight space formed by the sucked surface and the sucker body larger and the suction effect stronger. The sucker of the invention can adhere not only to a plane, but also to a curved surface, and overcomes the defect that a traditional sucker cannot adhere to a curved surface.

Reference numerals: 1. cavity; 2. storage slot; 3. accommodation through hole; 31. accommodation groove; 32. first through hole; 4. housing; 41. base; 411. outer housing; 412. inner housing; 42. sealing cover; 5. sealing post; 6. first sealing ring; 7. first groove; 8. return elastic member; 9. second sealing ring; 10. third sealing ring; 11. second groove; 12. connecting rod; 13. sucker body; 14. linkage key; 15. sealing gasket; 16. receding hole; 17. first limiting piece; 18. second limiting piece; 19. sucker base; 20. fixing member; 21. receding groove; 22. injection hole; 23. sealing mechanism; 231. screw; 232. fourth sealing ring; 24. first insertion slot; 25. second insertion slot; 26. deformation medium.

DETAILED DESCRIPTION OF THE INVENTION

For better understanding of the invention by those skilled in the art, the invention will be further described below with reference to the embodiments and drawings, and the contents mentioned in the embodiments are not intended to limit the invention.

Embodiment 1

Figure 1:
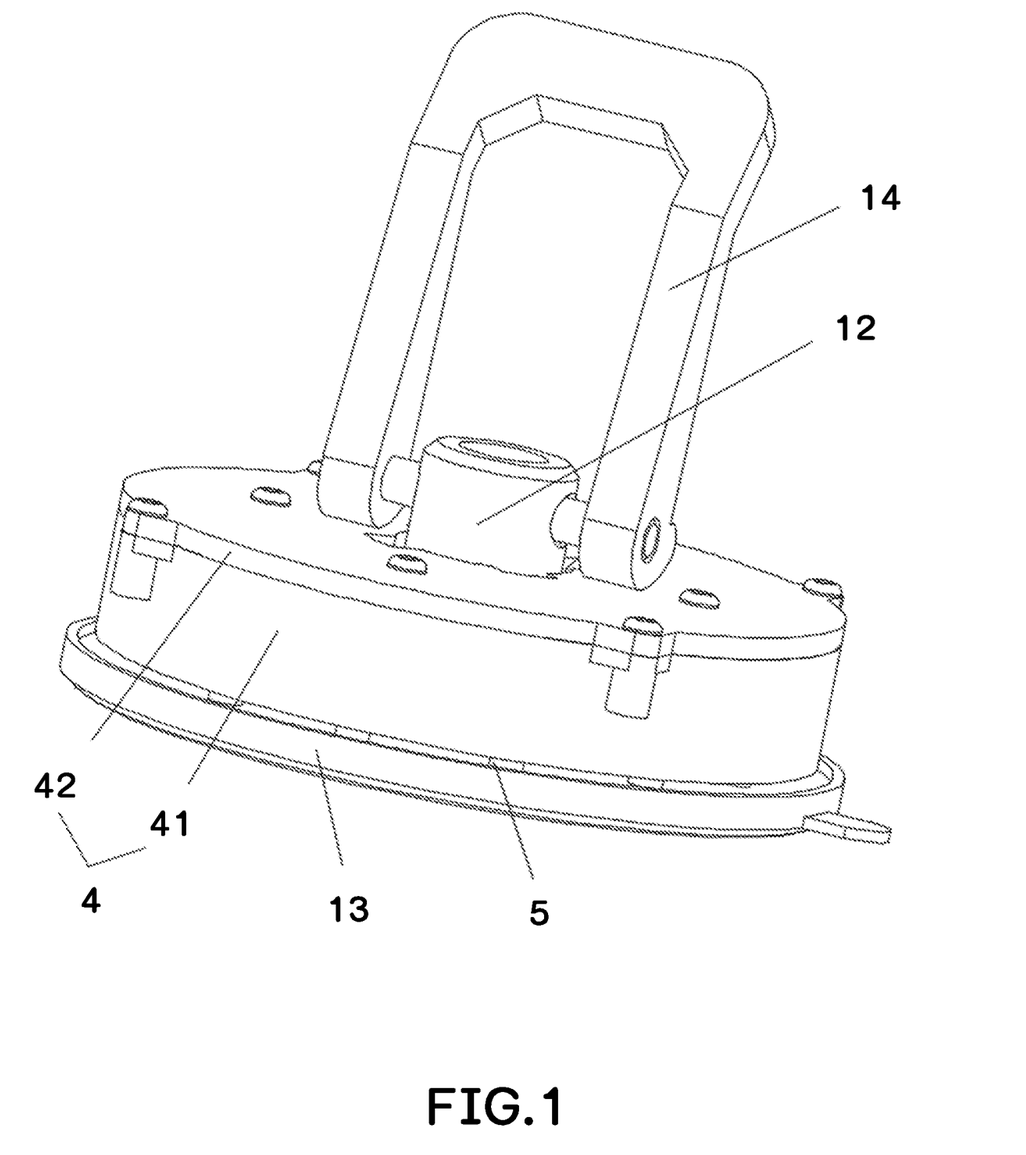
FIG. 1 is a structural diagram of a sucker using a pressure balancing device according to Embodiment 1 of the invention.
Figure 2:
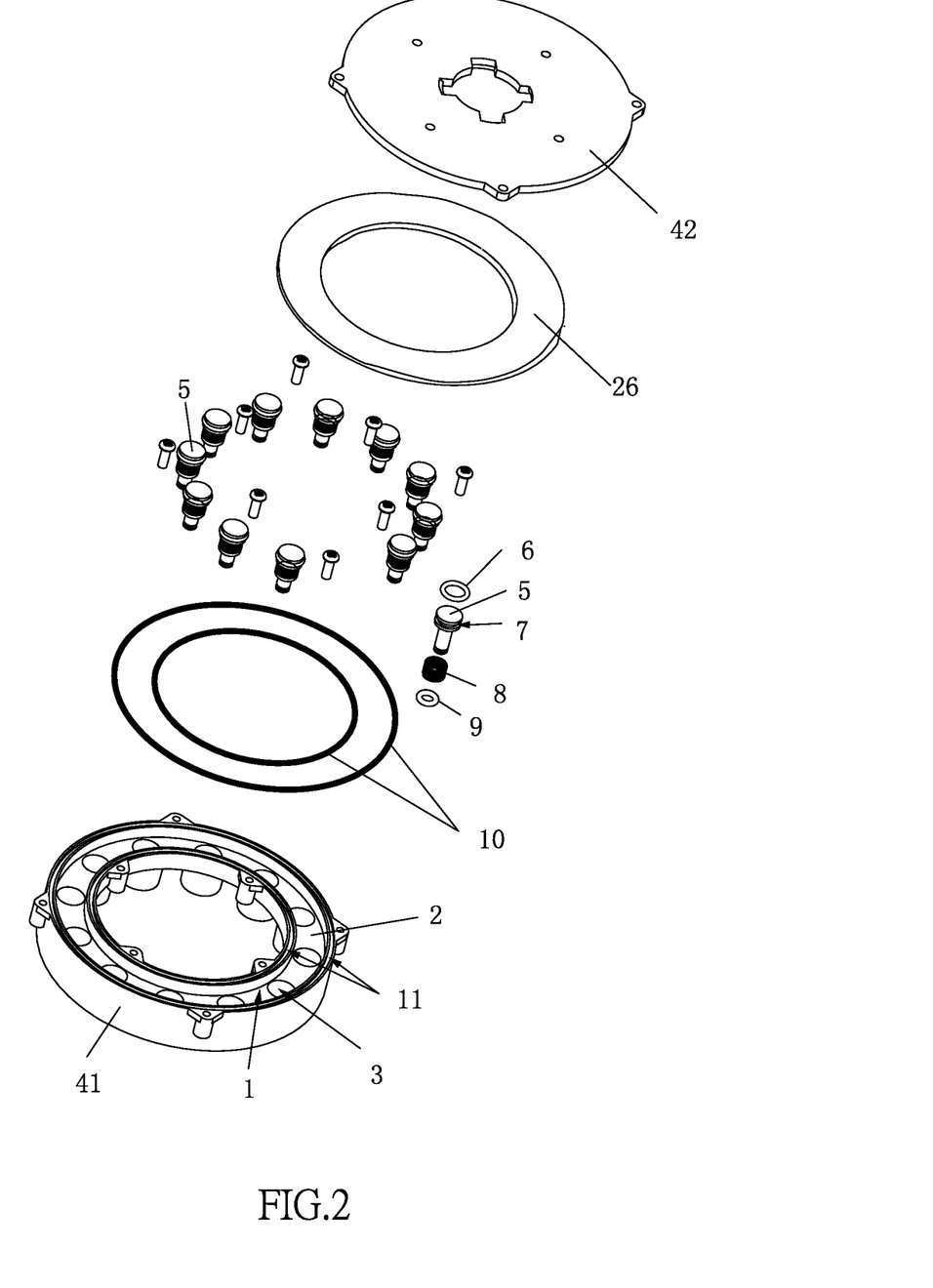
FIG. 2 is an exploded structural diagram of a pressure balancing device according to Embodiment 1 of the invention.
Figure 3:
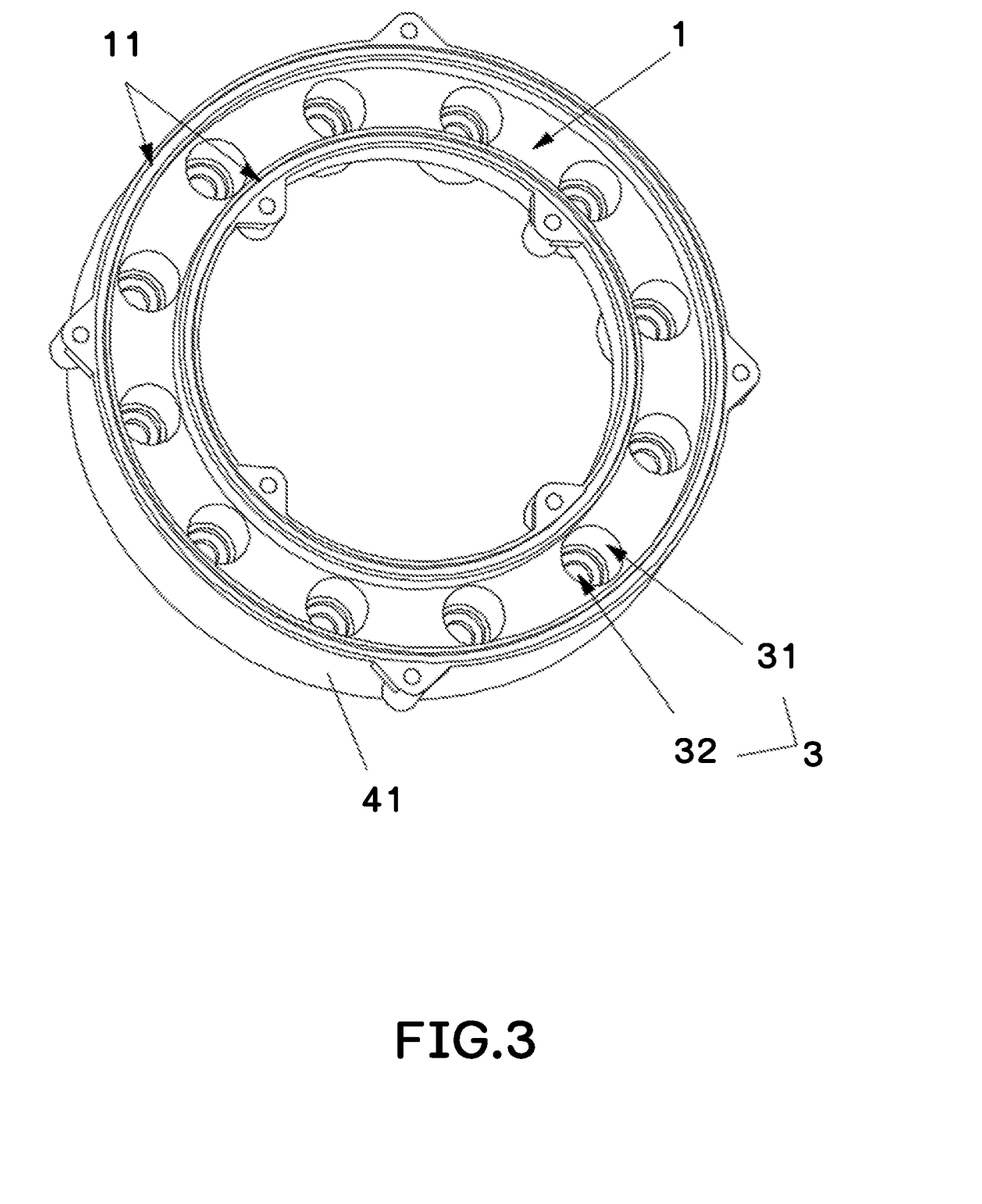
FIG. 3 is a structural diagram of a base according to Embodiment 1 of the invention.

As shown in FIG. 1-FIG. 3, a pressure balancing device comprises a housing 4, a deformation medium 26 accommodated in the housing 4 and capable of deforming under compression, and a sealing member movably connected with the housing 4 and capable of deforming under pressure. An airtight cavity 1 is formed between the housing 4 and the sealing member, the deformation medium 26 is accommodated in the cavity 1, and a bottom end of the sealing member protrudes out of the housing 4 and is used for abutting against an external structure. When part of the deformation medium 26 is compressed by the sealing member, the deformation medium 26 deforms so that a part, not compressed, of the deformation medium 26 compresses a corresponding part of the sealing member to make it protrude outwards.

When the pressure balancing device is in a normal state, the bottom end of the sealing member is located on the same horizontal plane, and the airtight cavity 1 is formed between the housing 4 and the sealing member. In actual use, the bottom end of the sealing member abuts against a contact surface of the external structure. When the contact surface of the external structure is flat, by manually applying downward pressure to the pressure balancing device, the bottom end of the sealing member is in full contact with the contact surface of the external structure, and the sealing member is stressed uniformly, as a result, the pressure balancing device is stressed uniformly and the effect of pressure balancing is achieved. When the contact surface of the external structure is a curved surface, the bottom end of the sealing member is not in full contact with the curved surface, that is, a part of the sealing member is in contact with the curved surface and the other part of the sealing member is not in contact with the curved surface, at this point, by applying downward pressure to the pressure balancing device, a part, in contact with the curved surface, of the sealing member is compressed to bend along a radian of the curved surface and compress a corresponding part of the deformation medium 26, that is, the sealing member deforms, the corresponding part of the deformation medium 26 is compressed, that is, the deformation medium 26 deforms, a part, not compressed, of the deformation medium 26 compresses a part, not compressed by the contact surface, of the sealing member to make it protrude outwards in a direction close to the contact surface (that is, when the sealing member and the deformation medium 26 are partially compressed inwards, the rest of the sealing member and the rest of the deformation medium 26 protrude outwards, and the working principle is the same as that of an air cushion being compressed), finally, a bottom surface of the sealing member is in full contact with the contact surface, and the bottom surface of the sealing member of the pressure balancing device and the contact surface are equally stressed at this point, thus achieving the effect of pressure balancing. The pressure balancing device is simple in structure, easy to assemble and convenient to operate, raw material cost and processing cost are saved a lot, the bottom end of the sealing member can be in full contact with the curved surface, so that the pressure balancing device is stressed uniformly, and the effect of pressure balancing is achieved. The pressure balancing device is applied to a sucker, and the sucker can adhere not only to a plane, but also to a curved surface, which is a breakthrough of the traditional technology of suckers. The deformation medium 26 is characterized by deforming after being compressed in the airtight cavity 1, and the compressed volume is transferred to the part which is not compressed, so that the volume of the part which is not compressed increases and extends outwards. The deformation medium 26 includes liquid medium, paste medium, quicksand medium or semi-fluid flexible glue medium. Preferably, the deformation medium 26 is a liquid medium.

The housing 4 is provided with a storage slot 2 for accommodating the deformation medium 26, a bottom wall of the storage slot 2 is provided with accommodation through holes 3, the sealing member protrudes out of a bottom of the accommodation through hole 3 and abuts against a side wall of the accommodation through hole 3, and the airtight cavity 1 is formed between an inner wall of the storage slot 2, the sealing member and the housing 4.

By adopting the above technical scheme, the airtight cavity 1 can be conveniently formed to accommodate the deformation medium 26 and allow the deformation medium 26 and the sealing member to be directly linked, so that the bottom surface of the sealing member of the pressure balancing device and the contact surface are equally stressed, thus achieving the effect of pressure balancing.

The sealing member comprises a plurality of sealing posts 5 protruding out of the bottom of the accommodation through hole 3 and abutting against the side wall of the accommodation through hole 3, and the sealing posts 5 are movably connected with the housing 4. Preferably, the sealing posts 5 are slidably connected with the housing 4.

In the present embodiment, the accommodation through holes 3 are sealed by the sealing posts 5 to prevent the deformation medium 26 from flowing out of the accommodation through holes 3 to cause leakage of liquid or external air from flowing into the storage slot 2 from the accommodation through holes 3 to cause a failure in the formation of the airtight cavity 1, thus affecting the normal use of the pressure balancing device. When the sealing member is stressed, the sealing posts 5 slide relative to the accommodation through holes 3 accordingly. When downward pressure is applied to the pressure balancing device, part of the sealing posts 5 making contact with the contact surface are compressed and compress the corresponding part of the deformation medium 26, that is, the sealing member deforms (the original position or shape changes), the corresponding part of the deformation medium 26 is compressed, that is, the deformation medium 26 deforms, the deformation medium 26 transmits force to the remaining sealing posts 5 in the airtight storage slot 2, so as to compress the sealing posts 5 not compressed by the contact surface to make them protrude outwards in the direction close to the contact surface, and finally, the bottom ends of all the sealing posts 5 abut against the contact surface, so as to achieve the effect of pressure balancing.

The sealing member further comprises first sealing rings 6 sleeved on each sealing post 5, and each first sealing ring 6 abuts against the side wall of the corresponding accommodation through hole 3. A side wall of each sealing post 5 is provided with a first groove 7, and each first sealing ring 6 is accommodated in the corresponding first groove 7.

By adopting the above technical scheme, the first sealing rings 6 and the sealing posts 5 are combined to seal the accommodation through holes 3, so that leakage of liquid or air circulation are more effectively avoided, the sealing effect is better, and the use effect of the pressure balancing device is better. When the sealing member is stressed, the sealing posts 5 and the first sealing rings 6 simultaneously slide relative to the accommodation through holes 3. A side wall of each first groove 7 plays a role of limiting the corresponding first sealing ring 6, on the one hand, it allows the first sealing ring 6 to be sleeved on the corresponding sealing post 5 easily; on the other hand, it prevents the first sealing ring 6 from disengaging from the sealing post 5 due to friction with the side wall of the first groove 7, thus ensuring the stability and position accuracy of the first sealing ring 6. In addition, the side wall of each first groove 7 abuts against the corresponding first sealing ring 6 to prevent the first sealing ring 6 from deforming under an external force when the sealing member is compressed, thereby preventing leakage of liquid or air circulation. Of course, the sealing member can also directly adopt soft rubber sealing posts 5 which have strong expansion capability, can tightly abut against the accommodation through holes 3, and are convenient to use, thus saving raw material cost and labor force.

Preferably, each accommodation through hole 3 comprises an accommodation groove 31 and a first through hole 32 formed in a bottom wall of the accommodation groove 31. The sealing member penetrates through the first through holes 32. The accommodation grooves 31 and the first through holes 32 are both circular. The diameter of the accommodation grooves 31 is larger than the diameter of the first through holes 32. The sealing member penetrates through the first through holes 32. The shape of the sealing posts 5 is in concavo-convex fit with the accommodation through holes 3, so as to prevent the sealing posts 5 from disengaging from the pressure balancing device via the first through holes 32.

Preferably, the housing 4 comprises a base 41 and a sealing cover 42 which covers the base 41, and the storage slot 2 is formed in the base 41. The pressure balancing device further comprises a third sealing ring 10 arranged between the sealing cover 42 and the base 41, wherein a top of the base 41 is provided with a second groove 11 for accommodating the third sealing ring 10. In other embodiments, the sealing effect is realized between the sealing cover 42 and the base 41 by ultrasonic bonding to replace the sealing effect of the third sealing ring 10, thus saving raw materials.

Preferably, the pressure balancing device further comprises return elastic members 8 for driving the sealing posts 5 to be restored, and each return elastic member 8 is sleeved on the corresponding sealing post 5 and accommodated in the corresponding accommodation groove 31. When the pressure balancing device is pressed down, part of the sealing member is compressed and moves in a direction close to the sealing cover 42, the distance between a top of the part of the sealing member and a bottom wall of the accommodation groove 31 is enlarged, and the return elastic members 8 corresponding to the part are in an extended state, while the other part of the sealing member moves in a direction close to the contact surface, the distance between a top of this part of the sealing member and the bottom wall of the accommodation groove 31 is reduced, and the return elastic members 8 corresponding to this part are compressed. If the external force on the pressure balancing device disappears, the compressed return elastic members 8 return to the original state and drive the corresponding part of the sealing member to be restored. The corresponding part of the sealing member is stressed and force is transmitted to the part, corresponding to the extended state of the return elastic members 8, of the sealing member through the deformation medium 26, so that the part, corresponding to the extended state of the return elastic members 8, of the sealing member moves in a direction away from the sealing cover 42 and is restored, thereby realizing the effect of overall restoration of the pressure balancing device and facilitating recycling. The return elastic member 8 of the present embodiment is a compression spring, one end of which abuts against a top of the corresponding sealing post 5, and the other end of which abuts against the bottom wall of the corresponding accommodation groove 31.

Preferably, the pressure balancing device further comprises second sealing rings 9 for sealing gaps between each accommodation groove 31 and the corresponding sealing post 5, and each second sealing ring 9 is arranged between the bottom wall of the corresponding accommodation groove 31 and the corresponding return elastic member 8; in this way, the accommodation through holes 3 are further sealed to provide a second sealing guarantee for sealing the accommodation through holes 3. Further, each second sealing ring 9 is sleeved on a side wall of the corresponding sealing post 5.

The embodiment also provides a sucker using the above pressure balancing device. The sucker comprises the pressure balancing device, a connecting rod 12 penetrating through the pressure balancing device, and a sucker body 13 connected with the connecting rod 12. A bottom end of the sealing member abuts against the sucker body 13.

In use, a bottom surface of the sucker body 13 is in contact with a sucked surface, the pressure balancing device is pressed down, and all the sealing posts 5 jointly drive the sucker body 13 to bend till the radian of the sucker body 13 is the same as the radian of the curved surface; at this point, air between the sucked surface and the sucker body 13 is discharged, and an airtight state is realized between the sucked surface and the sucker body 13; and then, the connecting rod 12 is pulled to make the airtight space formed by the sucked surface and the sucker body 13 larger and the suction effect stronger. The sucker of the invention can adhere not only to a plane, but also to a curved surface, which is a breakthrough of the traditional technology of suckers. When the sucker using the pressure balancing device adheres to a curved surface, the bending radian of the sucker body 13 is related to the height of the sealing member, and the higher the sealing member, the larger the bending radian of the sucker body 13, and the wider the range of application to a curved surface.

The sucker further comprises a pin shaft and a linkage key 14 arranged at a top of the pressure balancing device, and the linkage key 14 is connected with the connecting rod 12 through the pin shaft.

By adopting the technical scheme, the connecting rod 12 can be pulled by pressing the linkage key 14, so that the airtight space formed by the sucked surface and the sucker body 13 is larger, the suction effect is stronger, and the sucker of the invention is more convenient to use. In the present embodiment, the connecting rod 12 is pulled by pressing. In other embodiments, the connecting rod 12 can also be pulled in a spiral way as used in the prior art as well as other ways.

The sealing cover 42 can be applied to a mobile phone bracket through screw connection, pin connection, welding and other connection modes, so that the mobile phone bracket can be conveniently used under the condition that a contact surface is curved. In the present embodiment, a top surface of the sealing cover 42 is flat, while in other embodiments, a top surface of the sealing cover 42 is curved.

In the present embodiment, there is one storage slot 2, while in other embodiments, the storage slot 2 can be divided into at least two cavities 1 by a plurality of partition boards in the storage slot 2.

Embodiment 2

As shown in FIG. 4-FIG. 8, a pressure balancing device comprises a housing 4, a deformation medium 26 accommodated in the housing 4 and capable of deforming under compression, and a sealing member movably connected with the housing 4 and capable of deforming under pressure. An airtight cavity 1 is formed between the housing 4 and the sealing member, the deformation medium 26 is accommodated in the cavity 1, and a bottom end of the sealing member protrudes out of the housing 4 and is used for abutting against an external structure. When part of the deformation medium 26 is compressed by the sealing member, the deformation medium 26 deforms so that a part, not compressed, of the deformation medium 26 compresses a corresponding part of the sealing member to make it protrude outwards. The working principle is the same as that of Embodiment 1.

The sealing member is a sealing gasket 15, the sealing gasket 15 abuts against an inner wall of the housing 4 and protrudes out of a bottom of the housing 4, and the airtight cavity 1 is formed between the sealing gasket 15 and the housing 4.

The bottom of the housing 4 is provided with an anti-disengaging member for preventing the sealing member from disengaging from the housing 4, and the anti-disengaging member is provided with receding holes 16 for the sealing gasket 15 to penetrate through the anti-disengaging member.

In the present embodiment, a side wall of the sealing gasket 15 and a side wall of the housing 4 are hermetically connected to seal a gap between the sealing gasket 15 and the housing 4, so as to prevent the deformation medium 26 from flowing out of the gap between the sealing gasket 15 and the housing 4 to cause leakage of liquid or external air from flowing into the cavity 2 from the gap between the sealing gasket 15 and the housing 4 to cause a failure in the formation of the airtight cavity 1, thus affecting the normal use of the pressure balancing device. The anti-disengaging member limits the sealing gasket 15 to prevent the sealing gasket 15 from disengaging from the housing 4 and ensure that a bottom end of the sealing gasket 15 can normally abut against a contact surface. Preferably, the sealing gasket 15 is a soft rubber sealing gasket 15, which can better seal the housing 4 and prevent the cavity 1 from communicating with the outside.

By adopting the technical scheme, the leakage of the deformation medium 26 caused by the disengagement of the sealing member from the housing 4 can be prevented, the stability of the pressure balancing device is improved, and the sealing member can abut against the contact surface of an external structure, so that the pressure balancing device works normally.

The anti-disengaging member comprises a first limiting piece 17 and a second limiting piece 18 which are both arranged on an inner wall of the housing 4, the receding holes 16 are formed between the first limiting piece 17 and the second limiting piece 18, and the first limiting piece 17 and the second limiting piece 18 both abut against the sealing gasket 15.

In the present embodiment, the first limiting piece 17 and the second limiting piece 18 are used to limit the up-and-down movement position of the sealing gasket 15, so as to prevent the sealing gasket 15 from sliding down through a bottom of a base 41 to cause leakage of the deformation medium 26, as a result, the stability of the pressure balancing device is improved. Further, the housing 4 comprises the base 41 and a sealing cover 42 which covers the base 41. The base 41 comprises an outer housing 411 and an inner housing 412 which are both connected to a bottom of the sealing cover 42. The deformation medium 26 is accommodated between the outer housing 411 and the inner housing 412, so that the outer housing 411, the inner housing 412, the sealing gasket 15 and the sealing cover 42 form the airtight cavity 1 containing the deformation medium 26. When a part, in contact with the contact surface, of the sealing gasket 15 is compressed, a corresponding part of the deformation medium 26 is compressed, and the deformation medium 26 deforms, so that a part, not compressed, of the deformation medium 26 compresses a part, not compressed by the contact surface, of the sealing member to make it protrude outwards in a direction close to the contact surface, assembly is convenient, and processing cost is low. Preferably, the first limiting piece 17 is fixedly connected with the outer housing 411, and the second limiting piece 18 is fixedly connected with the inner housing 412. More preferably, the first limiting piece 17 and the outer housing 411 are of an integrated structure, and the second limiting piece 18 and the inner housing 412 are of an integrated structure. Preferably, a top of the outer housing 411 and a top of the inner housing 412 are both ultrasonically bonded with a bottom of the sealing cover 42, so that the sealing cover 42 is tightly bonded with the base 41 and the sealing stability is improved. The cross sections of the outer housing 411 and the inner housing 412 are concentric circles, and the diameter of the outer housing 411 is larger than the diameter of the inner housing 412.

Figure 4:
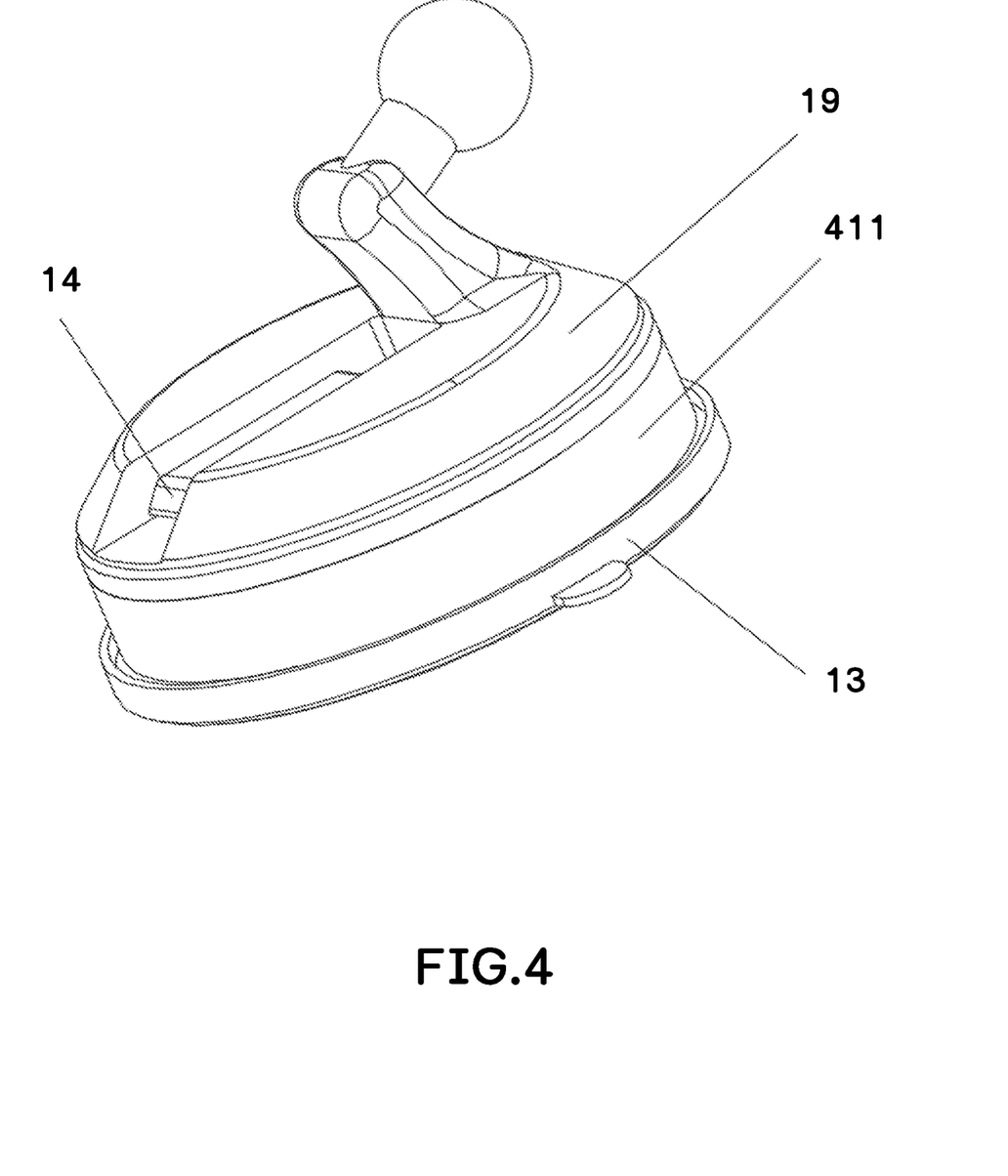
FIG. 4 is a structural diagram of a sucker using a pressure balancing device according to Embodiment 2 and Embodiment 3 of the invention.
Figure 5:
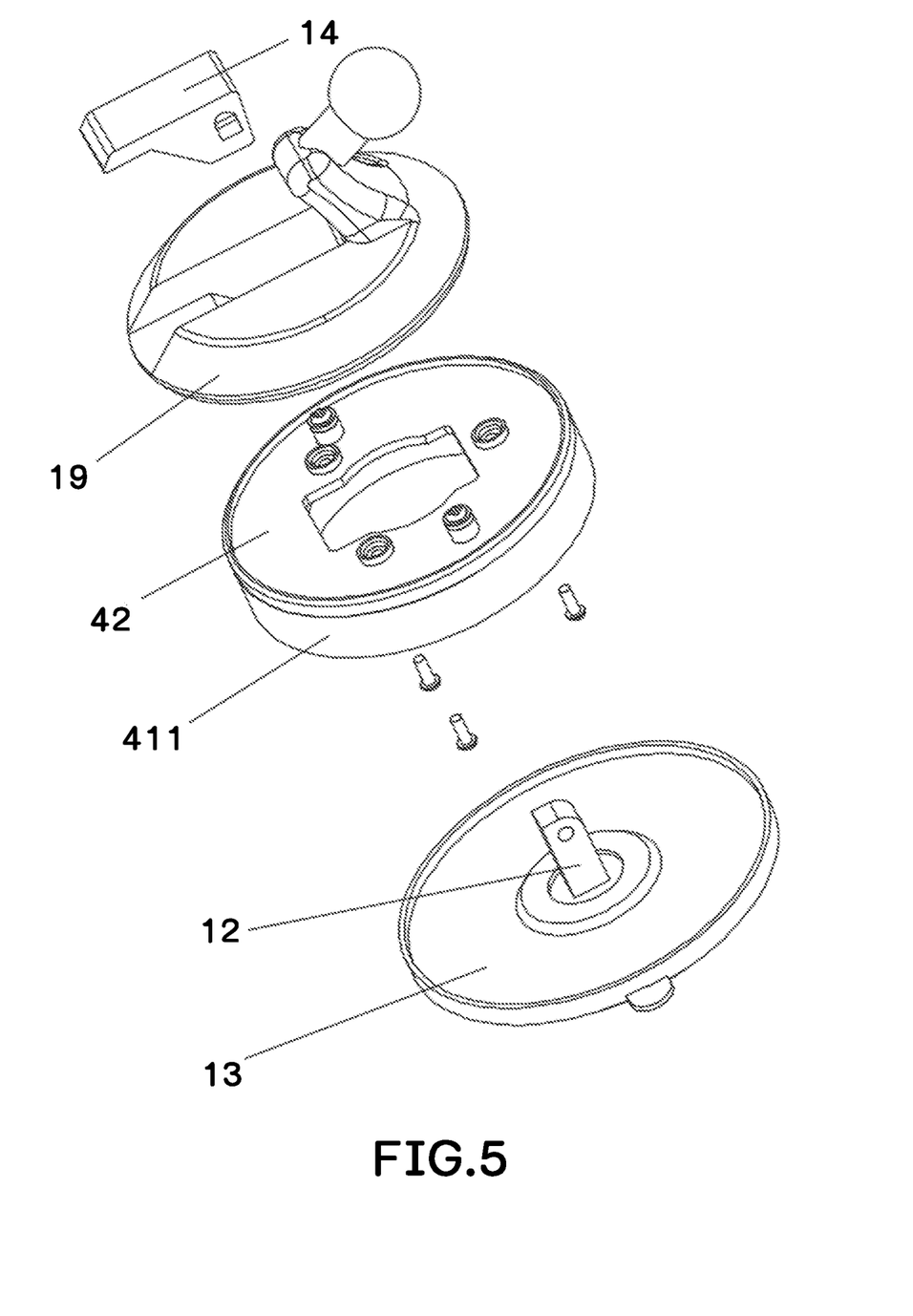
FIG. 5 is a partially exploded structural diagram of a sucker using a pressure balancing device according to Embodiment 2 and Embodiment 3 of the invention.
Figure 6:
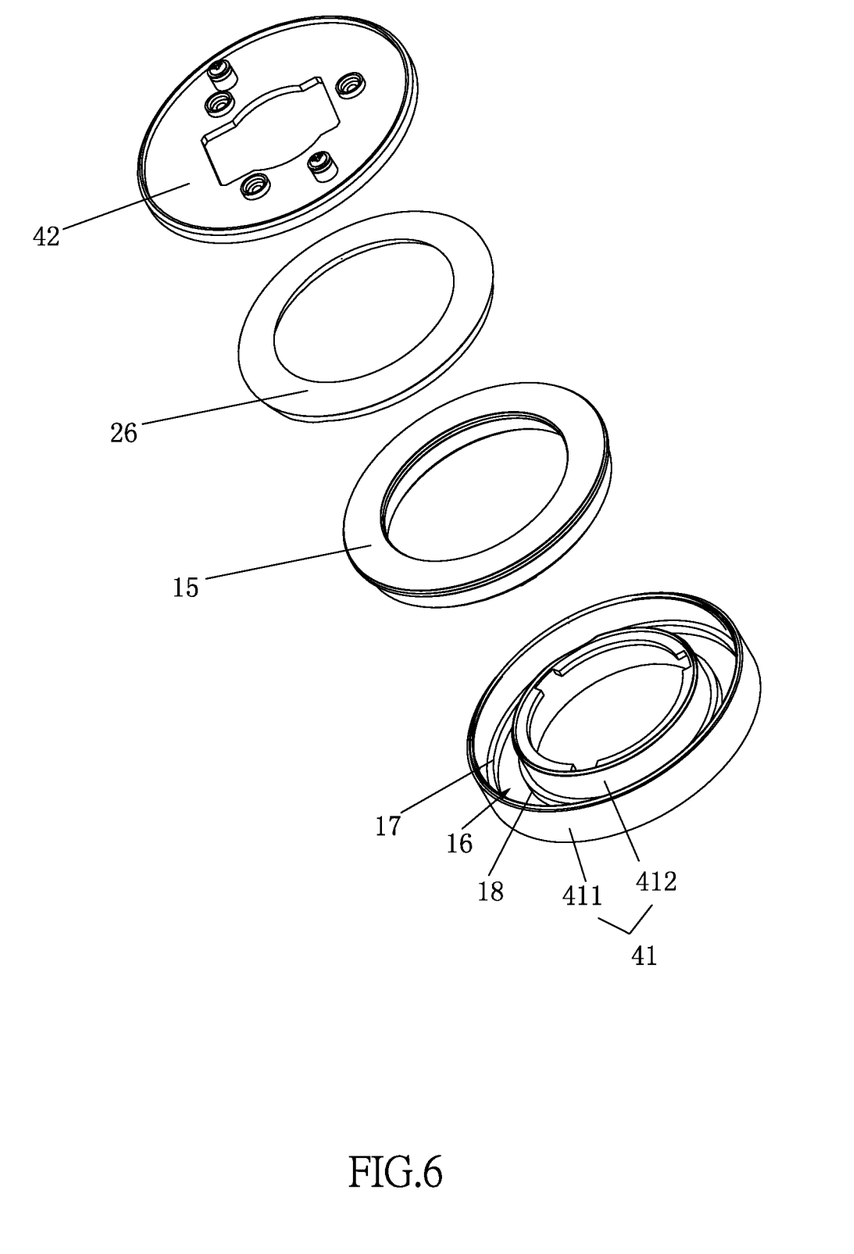
FIG. 6 is an exploded structural diagram of a pressure balancing device according to Embodiment 2 of the invention.
Figure 7:
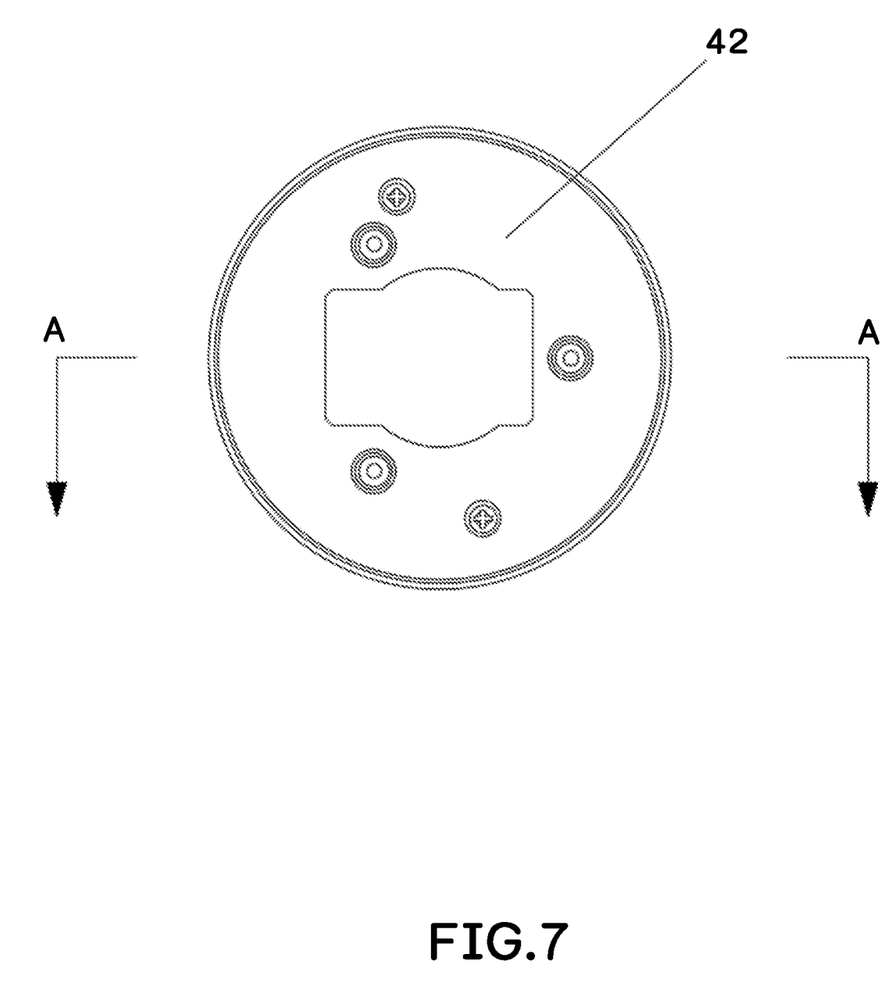
FIG. 7 is a structural diagram of a pressure balancing device according to Embodiment 2 of the invention.
Figure 8:
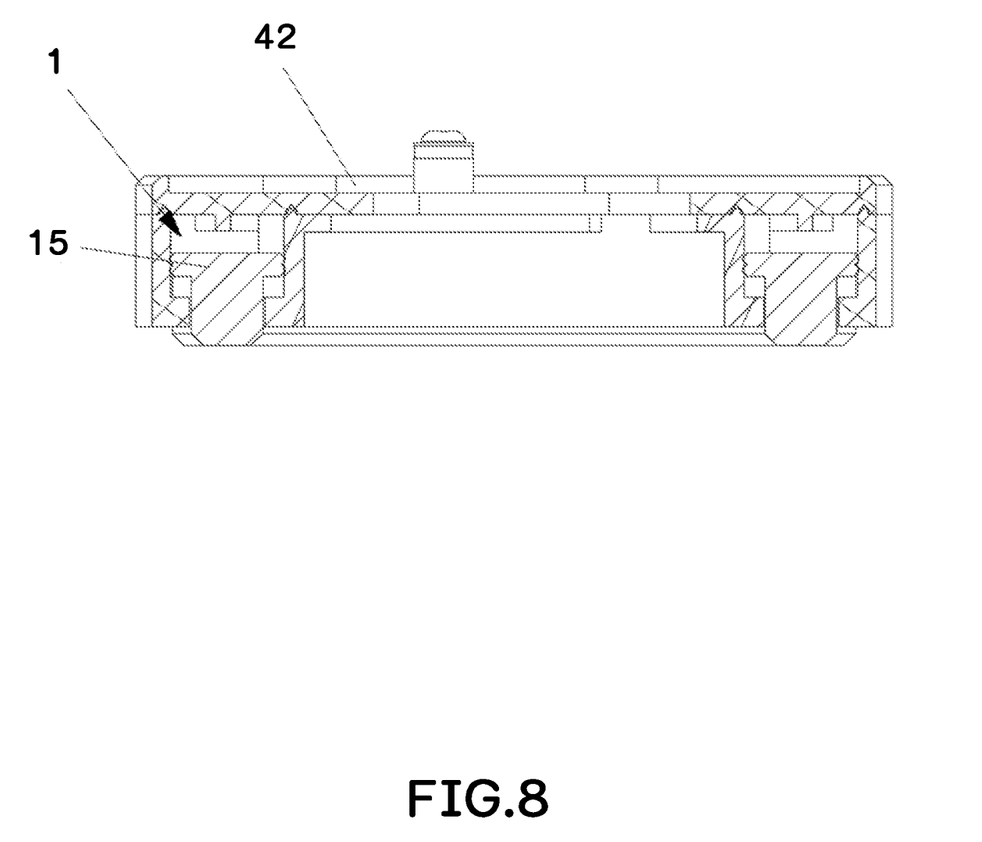
FIG. 8 is a sectional view of A-A in FIG. 7.
Figure 9:
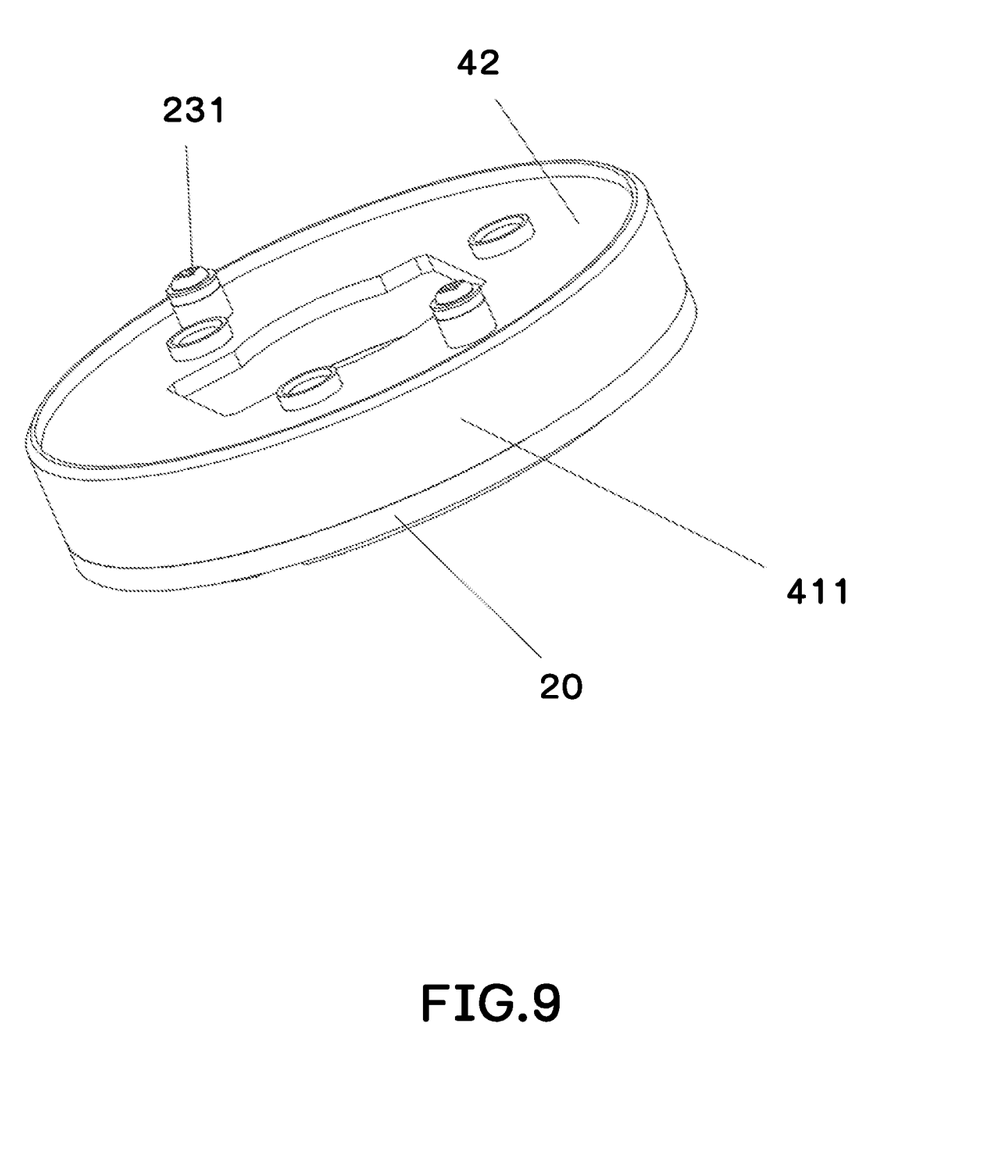
FIG. 9 is a structural diagram of a pressure balancing device according to Embodiment 3 of the invention.
Figure 10:
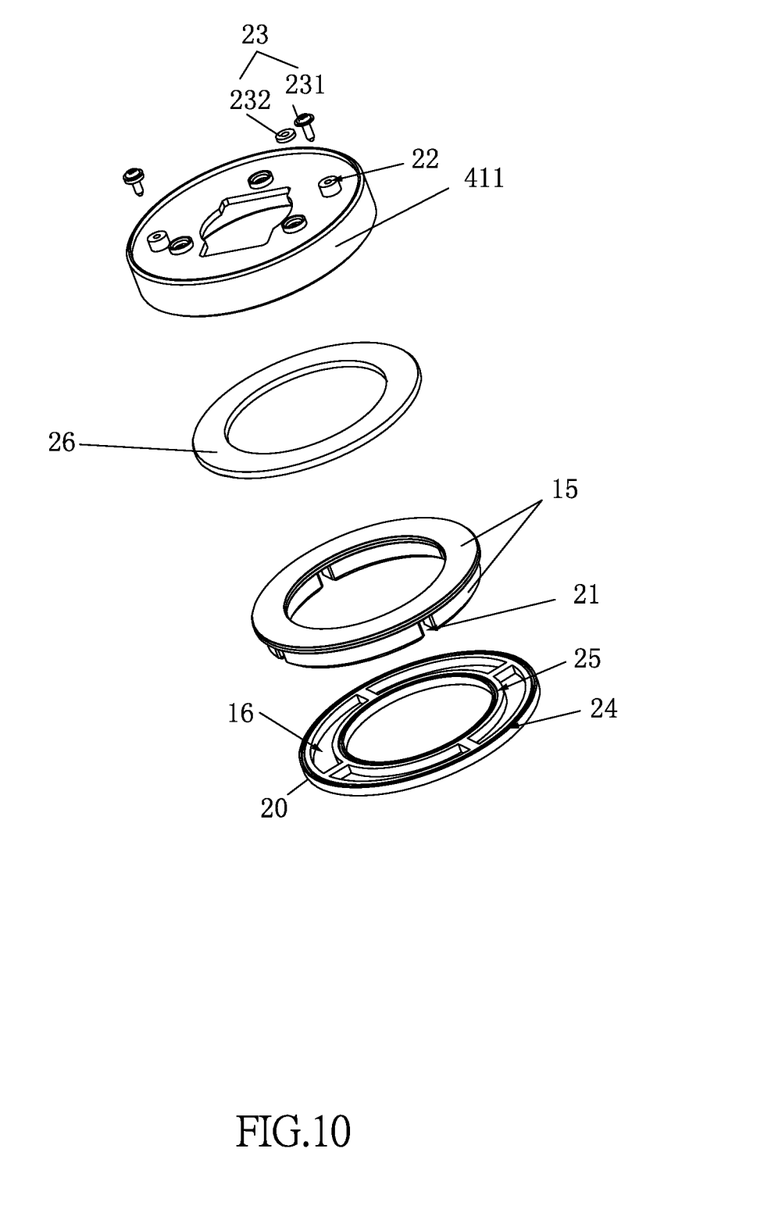
FIG. 10 is an exploded structural diagram of a pressure balancing device according to Embodiment 3 of the invention.
Figure 11:
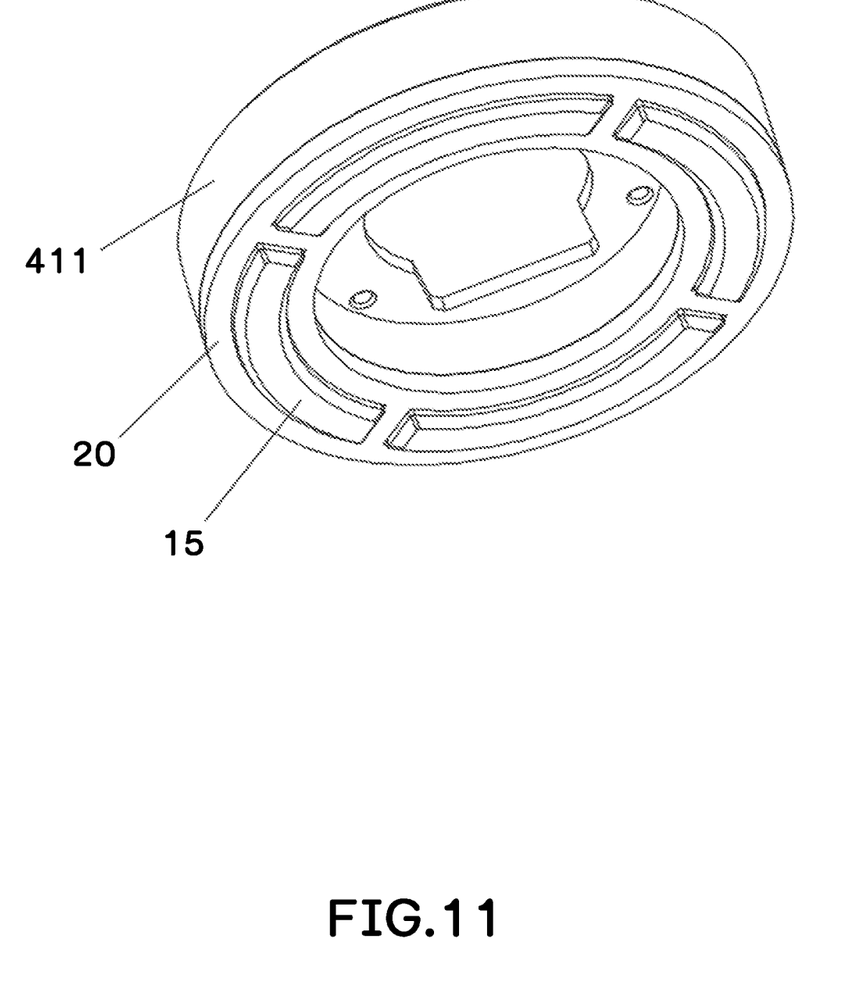
FIG. 11 is a structural diagram of a pressure balancing device according to Embodiment 3 of the invention from another perspective.
Figure 12:
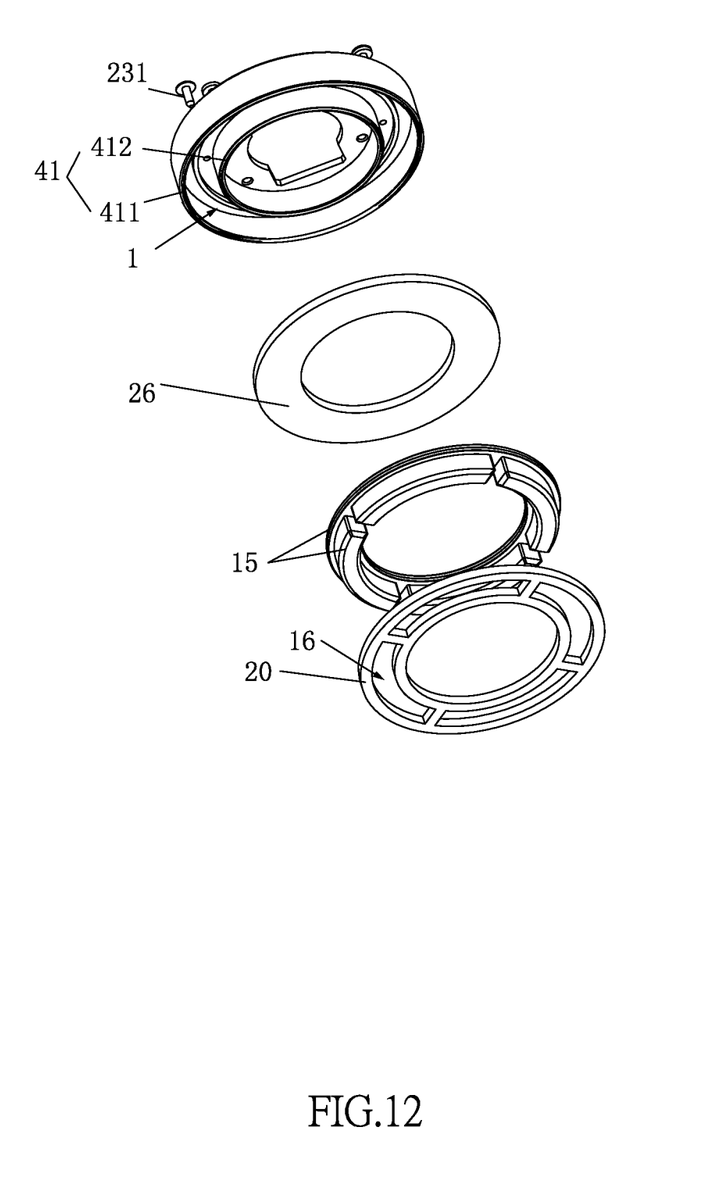
FIG. 12 is an exploded structural diagram of a pressure balancing device according to Embodiment 3 of the invention from another perspective.

The embodiment also provides a sucker using the above pressure balancing device. The sucker comprises the pressure balancing device, a connecting rod 12 penetrating through the pressure balancing device, and a sucker body 13 connected with the connecting rod 12. A bottom end of the sealing member abuts against the sucker body 13. The working principle is the same as that of Embodiment 1.

The sucker further comprises a sucker base 19 connected to a top of the pressure balancing device and a linkage key 14 arranged on the sucker base 19, and the linkage key 14 is connected with the connecting rod 12 through a pin shaft.

Embodiment 3

Embodiment 3 differs from Embodiment 2 in that:

As shown in FIG. 4, FIG. 5, and FIG. 9-FIG. 12, the anti-disengaging member comprises a fixing member 20 abutting against the bottom of the housing 4, the receding holes 16 are formed in the fixing member 20, the sealing gasket 15 penetrates through the fixing member 20 through the receding holes 16, and the number of the receding holes 16 is at least two.

By adopting the technical scheme, the sealing gasket 15 provides more bearing surfaces for the anti-disengaging member to abut against without affecting the normal operation of the sealing gasket 15. Preferably, the number of the receding holes 16 is set to be two. Of course, the number of the receding holes 16 can be three to twenty, and a support rod is arranged between two adjacent receding holes 16.

The sealing gasket 15 is provided with receding grooves 21, and the fixing member 20 is in contact with the sealing gasket 15 through the receding grooves 21, that is, each support rod abuts against an inner wall of the corresponding receding groove 21, so as to support the sealing gasket 15.

By adopting the technical scheme, leakage of the deformation medium 26 caused by sliding of the entire sealing gasket 15 out of the housing 4 via the fixing member 20 is prevented, and the stability of the pressure balancing device is improved. Preferably, a first insertion slot 24 is formed on one side, close to the outer housing 411, of the fixing member 20, and a bottom of the outer housing 411 is inserted into the first insertion slot 24. A second insertion slot 25 is formed on one side, close to the inner housing 412, of the fixing member 20, and a bottom of the inner housing 412 is inserted into the second insertion slot 25. In this way, engagement of the housing 4 and the anti-disengaging member is facilitated, assembly is convenient, and the connection stability of the housing 4 and the anti-disengaging member is improved.

The housing 4 is of an integrated structure, a top of the housing 4 is provided with injection holes 22 for injecting the deformation medium 26 into the cavity 1, and a top of each injection hole 22 is provided with a sealing mechanism 23 for sealing the injection hole 22.

In the present embodiment, due to the fact that the housing 4 is of an integrated structure, the structural stability and strength of the housing 4 are improved, the manufacturing and production of the housing 4 are facilitated, and manufacturing cost and time are reduced. During assembly, the sealing gasket 15 is installed into the housing 4 through the bottom of the housing 4, then the housing 4 is fixedly connected with the anti-disengaging member, then the deformation medium 26 is injected into the cavity 1 through the injection holes 22, and finally the injection holes 22 are sealed by the sealing mechanisms 23 to prevent the deformation medium 26 from leaking out through the sealing mechanisms 23, thus completing the assembly and processing of the pressure balancing device in the present embodiment. Assembly is convenient, and processing cost is low. Further, each sealing mechanism 23 comprises a screw 231 in screwed connection with the corresponding injection hole 22, and a fourth sealing ring 232 sleeved on the screw 231, wherein the fourth sealing ring 232 is used for sealing a gap between the screw 231 and the injection hole 22 to prevent the deformation medium 26 from leaking. The structure is simple and using is convenient.

The above embodiments are preferred implementation schemes of the invention. In addition, the invention can be implemented in other ways. Any obvious substitution is within the protection scope of the invention without departing from the concept of the invention.

What is claimed is:

1. A pressure balancing device, comprising
a housing,
a deformation medium accommodated in the housing and capable of deforming under compression, and
a sealing member movably connected with the housing and capable of deforming under pressure, wherein
an airtight cavity is formed between the housing and the sealing member, the deformation medium is accommodated in the cavity, and a bottom end of the sealing member protrudes out of the housing and is used for abutting against an external structure; and when part of the deformation medium is compressed by the sealing member, the deformation medium deforms so that a part, not compressed, of the deformation medium compresses a corresponding part of the sealing member to make the sealing member protrude outwards.

2. The pressure balancing device according to claim 1, wherein the housing is provided with a storage slot for accommodating the deformation medium, a bottom wall of the storage slot is provided with accommodation through holes, the sealing member protrudes out of a bottom of the accommodation through hole and abuts against a side wall of the accommodation through hole, and the airtight cavity is formed between an inner wall of the storage slot, the sealing member and the housing.

3. The pressure balancing device according to claim 2, wherein the sealing member comprises a plurality of sealing posts which protrude out of the bottom of the accommodation through hole and abut against the side wall of the accommodation through hole, and the sealing posts are movably connected with the housing.

4. The pressure balancing device according to claim 3, wherein the sealing member further comprises first sealing rings sleeved on each sealing post, each first sealing ring abuts against the side wall of the corresponding accommodation through hole, a side wall of each sealing post is provided with a first groove, and each first sealing ring is accommodated in the corresponding first groove.

5. The pressure balancing device according to claim 1, wherein the sealing member is a sealing gasket, the sealing gasket abuts against an inner wall of the housing and protrudes out of a bottom of the housing, and the airtight cavity is formed between the sealing gasket and the housing.

6. The pressure balancing device according to claim 5, wherein the bottom of the housing is provided with an anti-disengaging member preventing to prevent a disconnection of the sealing member from the housing, and the anti-disengaging member is provided with receding holes for the sealing gasket to penetrate through the anti-disengaging member.

7. The pressure balancing device according to claim 6, wherein the anti-disengaging member comprises a first limiting piece and a second limiting piece which are both arranged on an inner wall of the housing, the receding holes are formed between the first limiting piece and the second limiting piece, and the first limiting piece and the second limiting piece both abut against the sealing gasket.

8. The pressure balancing device according to claim 6, wherein the anti-disengaging member comprises a fixing member abutting against the bottom of the housing, the receding holes are formed in the fixing member, the sealing gasket penetrates through the fixing member through the receding holes, and the number of the receding holes is at least two.

9. The pressure balancing device according to claim 8, wherein the sealing gasket is provided with receding grooves, and the fixing member is in contact with the sealing gasket through the receding grooves.

10. The pressure balancing device according to claim 9, wherein the housing is of an integrated structure, a top of the housing is provided with injection holes for injecting the deformation medium into the cavity, and a top of each injection hole is provided with a sealing mechanism for sealing the injection hole.

11. A sucker using the pressure balancing device according to claim 1, wherein the sucker comprises the pressure balancing device, a connecting rod which penetrates through the pressure balancing device, and a sucker body connected with the connecting rod, and a bottom end of the sealing member abuts against the sucker body.

* * * * *